(12) United States Patent
Fukui et al.

(10) Patent No.: US 10,634,905 B2
(45) Date of Patent: Apr. 28, 2020

(54) POLYGON MIRROR SCANNER MOTOR

(71) Applicant: Minebea Mitsumi Inc., Nagano (JP)

(72) Inventors: Yasushi Fukui, Yonago (JP); Masahiko Anko, Yonago (JP); Koji Hiraguchi, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 110 days.

(21) Appl. No.: 15/927,209

(22) Filed: Mar. 21, 2018

(65) Prior Publication Data

US 2018/0284426 A1   Oct. 4, 2018

(30) Foreign Application Priority Data

Mar. 31, 2017   (JP) .................... 2017-070122

(51) Int. Cl.
*G02B 26/12* (2006.01)
*G02B 7/182* (2006.01)
*G02B 5/09* (2006.01)

(52) U.S. Cl.
CPC ......... *G02B 26/121* (2013.01); *G02B 7/1821* (2013.01); *G02B 5/09* (2013.01)

(58) Field of Classification Search
None
See application file for complete search history.

(56) References Cited

U.S. PATENT DOCUMENTS 4,866,324 A * 9/1989 Yuzawa ............... G02B 26/121
                                                     310/268
5,138,477 A * 8/1992 Omura .................... F16C 19/55
                                                     310/90

(Continued)

FOREIGN PATENT DOCUMENTS

JP    09-197332 A    7/1997
JP    09-203877 A    8/1997

(Continued)

OTHER PUBLICATIONS

Decision to Grant a Patent dated Jan. 7, 2020 for corresponding Japanese Application No. 2017-070122 and English translation.

(Continued)

*Primary Examiner* — Jennifer D. Carruth
(74) *Attorney, Agent, or Firm* — Pearne & Gordon LLP

(57) ABSTRACT

A distance between the rotary shaft and the pressurizing position of the polygon mirror by the mirror fixing spring is shorter than a distance between the rotary shaft and a position at which the polygon mirror comes into contact with the seat surface. When a difference between an outer radius and an inner radius of the polygon mirror is defined as A, and a difference between the distance between the rotary shaft and the pressurizing position of the polygon mirror by the mirror fixing spring and the distance between the rotary shaft and the position at which the polygon mirror comes into contact with the seat surface is defined as C, the relationship of $0 < C \leq A/4$ is established. When a distance, in a direction orthogonal to the rotary shaft, between a position at which the inner diameter side of the polygon mirror comes into contact with the sleeve and the position of the seat surface is defined as E, the relationship of $A/3 \leq E \leq A/2$ is established.

9 Claims, 10 Drawing Sheets

(56) References Cited

U.S. PATENT DOCUMENTS

| | | | | |
|---|---|---|---|---|
| 5,463,490 | A * | 10/1995 | Seto | F16C 19/56 310/90 |
| 5,532,729 | A * | 7/1996 | Nakasugi | F16C 17/08 347/257 |
| 5,559,320 | A * | 9/1996 | Loya | G06K 7/10613 235/462.39 |
| 5,900,903 | A * | 5/1999 | Fukita | B41J 2/471 310/105 |
| 6,031,650 | A * | 2/2000 | Suzuki | G02B 26/121 359/198.1 |
| 6,031,651 | A * | 2/2000 | Nakasugi | F16C 39/063 359/200.1 |
| 6,215,217 | B1 * | 4/2001 | Kurosawa | F16C 17/02 310/67 R |
| 7,428,087 | B1 * | 9/2008 | Horng | G02B 26/121 310/90.5 |
| 8,169,677 | B2 * | 5/2012 | Oh | G02B 26/121 359/200.1 |
| 9,594,196 | B2 * | 3/2017 | Hayakawa | G02B 5/09 |
| 9,851,558 | B2 * | 12/2017 | Hayakawa | B41J 2/471 |
| 2002/0021477 | A1 | 2/2002 | Fukita | G02B 26/121 359/200.1 |
| 2005/0018326 | A1 * | 1/2005 | Yoon | G02B 26/121 359/877 |
| 2005/0046733 | A1 * | 3/2005 | Bang | G02B 26/121 348/335 |
| 2007/0115527 | A1 * | 5/2007 | Lee | G02B 26/121 359/200.1 |
| 2008/0260312 | A1 * | 10/2008 | Nishino | F16D 3/77 384/446 |
| 2011/0170154 | A1 * | 7/2011 | Song | F16C 17/02 359/200.5 |
| 2011/0299146 | A1 * | 12/2011 | Oh | H02K 1/30 359/200.1 |
| 2015/0240866 | A1 * | 8/2015 | Sakuragi | F16C 17/08 359/200.4 |
| 2015/0248077 | A1 * | 9/2015 | Hoshino | G03G 15/04036 399/216 |
| 2015/0309308 | A1 * | 10/2015 | Goto | G02B 26/121 359/200.2 |
| 2019/0265608 | A1 * | 8/2019 | Nishiguchi | G03G 15/04072 |

FOREIGN PATENT DOCUMENTS

| | | |
|---|---|---|
| JP | 2000-241741 A | 9/2000 |
| JP | 2000-241742 A | 9/2000 |
| JP | 2006-187970 A | 7/2006 |
| JP | 2008-089947 A | 4/2008 |
| JP | 2010-039337 A | 2/2010 |
| JP | 2015-210373 A | 11/2015 |

OTHER PUBLICATIONS

Japanese Office Action dated Sep. 10, 2019 for corresponding Japanese Application No. 2017-070122 and English translation.

* cited by examiner

POLYGON MIRROR SCANNER MOTOR

CROSS REFERENCE TO RELATED APPLICATIONS

This application claims the benefit of Japanese Patent Application No. 2017-070122, filed Mar. 31, 2017, which is hereby incorporated by reference in its entirety.

BACKGROUND

Technical Field

The present disclosure is related to a polygon mirror scanner motor, and more particularly, to a polygon mirror scanner motor in which a polygon mirror is fixed with a mirror fixing spring.

Background Art

In laser writing systems such as laser printers, polygon mirror scanner motors have been used as light deflectors. A polygon mirror scanner motor rotates a polygon mirror at high speed so as to scan a photoreceptor with a laser light irradiated from an LD (a laser diode).

Japanese Patent Application Laid-Open No. 2000-241741 discloses a polygon mirror rotary driving device in which the lower surface of a polygon mirror 30 is disposed on a mirror placing surface 26 of a rotor 20. The upper surface of the polygon mirror 30 is fixed with a spring section 505 of a mirror pressing member 50 fitted in an engagement groove of the rotor 20.

Japanese Patent Application Laid-Open No. 2000-241742 discloses a configuration similar to the configuration of Japanese Patent Application Laid-Open No. 2000-241741.

Japanese Patent Application Laid-Open No. 2006-187970 discloses a polygon mirror scanner motor in which the lower surface of a polygon mirror 5 is disposed on a receiving surface 2c of a boss 2. As shown in FIG. 8 of Japanese Patent Application Laid-Open No. 2006-187970, a protruding section of the upper portion of a polygon mirror 5 is fixed with a mirror pressing spring 110 fitted in a groove 101b of a shaft 101.

Japanese Patent Application Laid-Open No. 2010-39337 discloses a configuration analogous to the configuration of Japanese Patent Application Laid-Open No. 2006-187970.

SUMMARY

FIG. 13 is a partial enlarged view for explanation of a configuration for holding a polygon mirror P in a first example of the conventional technique.

With reference to FIG. 13, a seat surface 507 is formed on a sleeve 509 attached to a motor rotary shaft. A polygon mirror P is placed on the seat surface 507. The inner diameter section of the polygon mirror P comes into contact with a rotary shaft of the sleeve 509.

A mirror fixing spring 505 is set on the upper surface of the polygon mirror P. A spring fixing ring 501 for fixing the mirror fixing spring 505 is provided on the mirror fixing spring 505. The inner diameter section of the spring fixing ring 501 is fitted in the rotary shaft of the sleeve 509.

At a position above the seat surface 507, the mirror fixing spring 505 presses the polygon mirror P against the seat surface 507. As a result, the polygon mirror P is fixed while being sandwiched between the mirror fixing spring 505 and the seat surface 507.

In the configuration in FIG. 13, the spring fixing ring 501 for fixing the mirror fixing spring 505 is necessary. Meanwhile, reduction in the number of components has been desired in order to reduce the cost of the polygon mirror scanner motor.

Moreover, if a pressurizing position (a load position) of the mirror fixing spring 505 is set on an inner side, the spring load becomes large so that deformation of the polygon mirror P occurs. Therefore, decreasing the diameter of the pressuring position is difficult. In addition, since an end of the mirror fixing spring 505 has a straight shape, the mirror fixing spring 505 does not easily slide on the top surface of the polygon mirror P when the spring is pressurized. As a result, the mirror fixing spring 505 bites into the polygon mirror P. Thus, the polygon mirror P is likely to be deformed.

FIG. 14 is a partial enlarged view for explanation of a configuration for holding a polygon mirror P in a second example of the conventional technique.

The configuration in FIG. 14 is conceivable as a configuration for achieving reduction in the number of components.

In the configuration in FIG. 14, a spring fixing groove 601 is formed in a sleeve 609. Accordingly, a mirror fixing spring 605 is fixed. As a result, the need for the spring fixing ring 501 in FIG. 13 can be eliminated.

In each of FIGS. 13 and 14, the pressurizing position of the mirror fixing spring 505, 605 is substantially equivalent, in the radius direction, to the position of the seat surface 507, 607 (the respective distances from the rotary shaft are substantially equal to each other, and the pressurizing position of the mirror fixing spring 505, 605 exists on a flat surface of the seat surface 507, 607 with which the polygon mirror P comes into contact).

The present disclosure is related to providing a polygon mirror scanner motor to which a polygon mirror can be attached with excellent precision.

According to a first aspect of the present disclosure, a polygon mirror scanner motor includes a sleeve to which a polygon mirror is attached and which is rotatable about a rotary shaft, a seat surface rotatable, together with the sleeve, about the rotary shaft, and a mirror fixing spring configured to fix the polygon mirror, wherein the polygon mirror includes a first surface and a second surface, the first surface of the polygon mirror comes into contact with the seat surface, the second surface of the polygon mirror is pressurized by the mirror fixing spring, a distance between the rotary shaft and the pressurizing position of the polygon mirror by the mirror fixing spring is shorter than a distance between the rotary shaft and a position at which the polygon mirror comes into contact with the seat surface, when a difference between an outer radius and an inner radius of the polygon mirror is defined as A and a difference between the distance between the rotary shaft and the pressurizing position of the polygon mirror by the mirror fixing spring and the distance between the rotary shaft and the position at which the polygon mirror comes into contact with the seat surface is defined as C, the relationship of $$0 < C \leq A/4$$

is established, an inner diameter side of the polygon mirror comes into contact with the sleeve, and when a distance, in a direction orthogonal to the rotary shaft, between a position at which the inner diameter side of the polygon mirror comes into contact with the sleeve and the position of the seat surface is defined as E, the relationship of $$A/3 \leq E \leq A/2$$

is established.

It is preferable that the mirror fixing spring pressurizes a flat surface section of the polygon mirror.

It is preferable that the length, in the direction orthogonal to the rotary axis, of the seat surface is longer than 0.1 mm.

It is preferable that a spring fixing groove is formed in the sleeve, that the mirror fixing spring engages with the spring fixing groove, and when a plate thickness of the mirror fixing spring is defined as t, and a depth in the direction orthogonal to the rotary shaft of the spring fixing groove is defined as W, the relationship of $$t<W$$

is established.

It is preferable that the mirror fixing spring includes a curved surface section, the mirror fixing spring pressurizes the flat surface section of the polygon mirror via the curved surface section, and a curvature radius R of the curved surface section is larger than 0.2 mm.

It is preferable that the mirror fixing spring includes a curved surface section, the mirror fixing spring pressurizes the flat surface section of the polygon mirror via the curved surface section, a flat surface section is provided on a side that is further out than the curved surface section of the mirror fixing spring, and an angle θ1 between the flat surface section provided to the mirror fixing spring and the flat surface section of the polygon mirror is larger than 2°.

It is preferable that a spring fixing groove is formed in the sleeve, the mirror fixing spring engages with the spring fixing groove through a flat surface of an inner end section of the mirror fixing spring, and an angle θ2 between the flat surface of the inner end section of the mirror fixing spring and a plane parallel to the rotary shaft is smaller than 45°.

According to a second aspect of the present disclosure, a polygon mirror scanner motor includes a sleeve to which a polygon mirror is attached and which is rotatable about a rotary shaft, a seat surface rotatable, together with the sleeve, about the rotary shaft, and a mirror fixing spring configured to fix the polygon mirror, wherein the polygon mirror includes a first surface and a second surface, the first surface of the polygon mirror comes into contact with the seat surface, the second surface of the polygon mirror is pressurized by the mirror fixing spring, a distance between the rotary shaft and a pressurizing position of the polygon mirror by the mirror fixing spring is shorter than a distance between the rotary shaft and a position at which the polygon mirror comes into contact with the seat surface, and the mirror fixing spring pressurizes a flat surface section of the polygon mirror.

It is preferable that the mirror fixing spring includes a curved surface section, and the mirror fixing spring pressurizes the flat surface section of the polygon mirror via the curved surface section.

According to the present disclosure, a polygon mirror scanner motor to which a polygon mirror can be attached with excellent precision can be provided.

DETAILED DESCRIPTION

Figure 1:
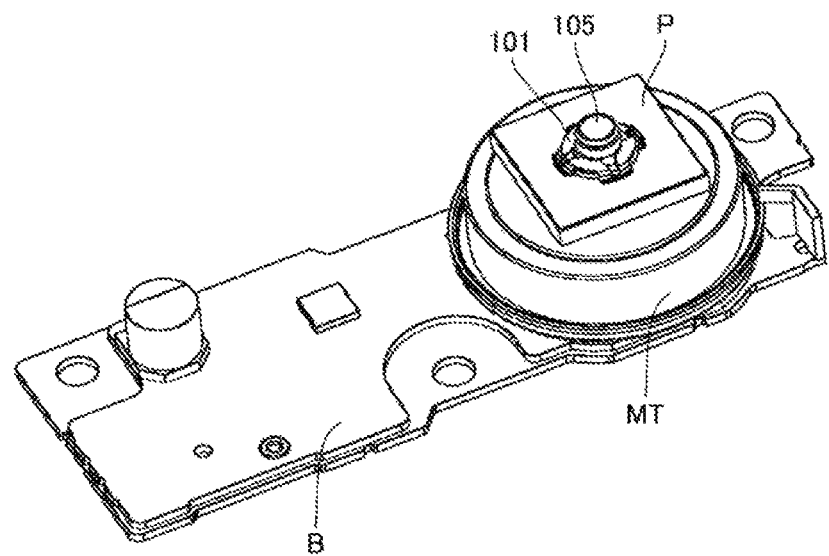
FIG. 1 is a perspective view of a polygon mirror scanner motor in one embodiment of the present disclosure.

FIG. 1 is a perspective view of a polygon mirror scanner motor in one embodiment of the present disclosure.

As illustrated in FIG. 1, the polygon mirror scanner motor includes a base part B on which a control circuit is formed, a motor MT, a sleeve 105 attached to a rotary shaft of the motor MT, a polygon mirror P which is placed on a seat surface of the sleeve 105, and a mirror fixing spring 101 configured to press the polygon mirror P against the seat surface from above.

Figure 2:
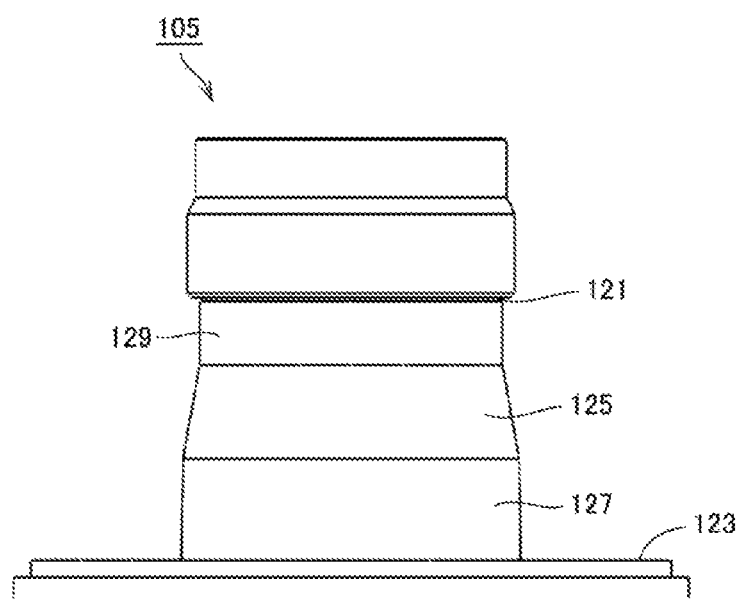
FIG. 2 is a side view of a sleeve 105 of the polygon mirror scanner motor in FIG. 1.
Figure 3:
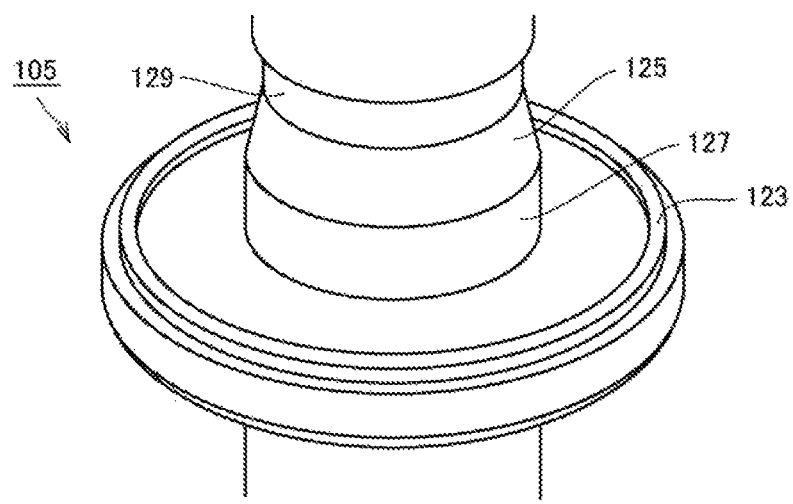
FIG. 3 is a perspective view of a part of the sleeve 105 of the polygon mirror scanner motor in FIG. 1 when viewed obliquely from above.
Figure 4:
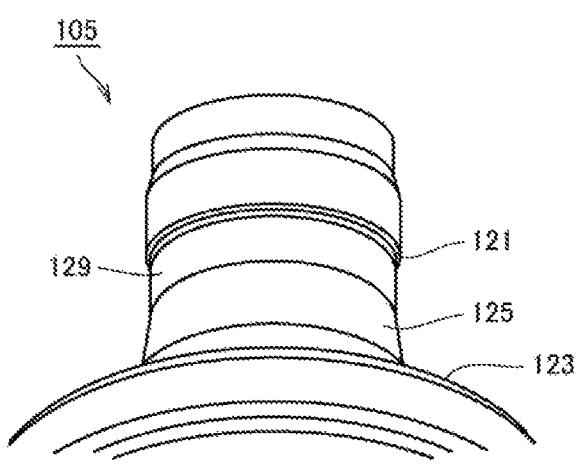
FIG. 4 is a perspective view of a part of the sleeve 105 of the polygon mirror scanner motor in FIG. 1 when viewed obliquely from below.
Figure 5:
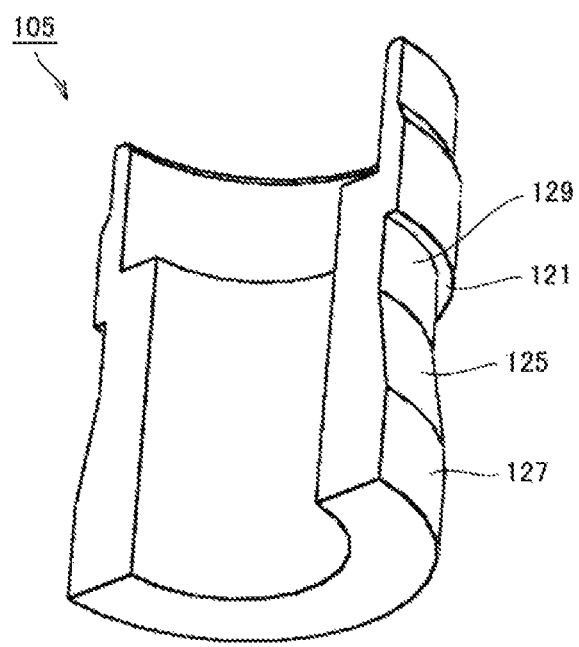
FIG. 5 is a perspective view in cross section for explanation of the structure of the sleeve 105 of the polygon mirror scanner motor in FIG. 1.

FIG. 2 is a side view of the sleeve 105 of the polygon mirror scanner motor in FIG. 1. FIG. 3 is a perspective view of a part of the sleeve 105 of the polygon mirror scanner motor in FIG. 1 when viewed obliquely from above. FIG. 4 is a perspective view of a part of the sleeve 105 of the polygon mirror scanner motor in FIG. 1 when viewed obliquely from below. FIG. 5 is a perspective view in cross section for explanation of the structure of the sleeve 105 of the polygon mirror scanner motor in FIG. 1.

With reference to FIGS. 2 to 5, the sleeve 105 has a cylindrical shape having a rotary shaft in the longitudinal direction. A disk section configured to rotate about the rotary shaft of the motor MT is provided in the lower portion of the sleeve 105. An annular seat surface 123 is formed on the disk section. In order from below, a cylindrical section 127, a truncated cone section 125 being positioned on the cylindrical section 127 and having a diameter decreasing in the upward direction, a cylindrical section 129 positioned on the truncated cone section 125, and a spring fixing groove 121 formed by providing, on the cylindrical section 129, a cylindrical section having a diameter larger than the diameter of the cylindrical section 129 are provided on a part where the disk section is formed in the sleeve 105. When viewed from a direction in which the rotary shaft of the motor MT extends, the aforementioned disk, the seat surface 123, the cylindrical section 127, the truncated cone section 125, the cylindrical section 129, and the spring fixing groove 121 have respective circular shapes which are concentric with one another. The aforementioned disk, the seat surface 123, the cylindrical section 127, the truncated cone section 125, the cylindrical section 129, and the spring fixing groove 121 may be integrally formed. Alternatively, some or all of the aforementioned disk, the seat surface 123, the cylindrical section 127, the truncated cone section 125, the cylindrical section 129, and the spring fixing groove 121 may be formed separately and bonded together.

Figure 6A:
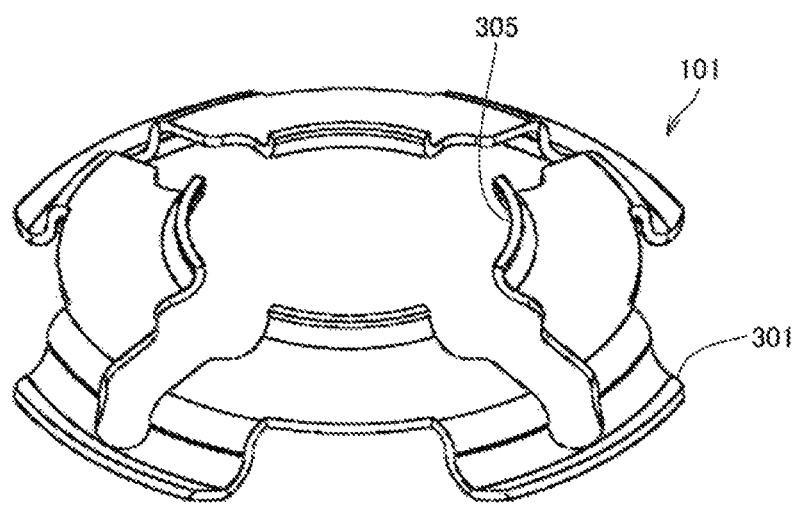
FIGS. 6A and 6B are diagrams of a mirror fixing spring 101 of the polygon mirror scanner motor in FIG. 1 when viewed from an oblique side and from a lateral side.
Figure 6B:
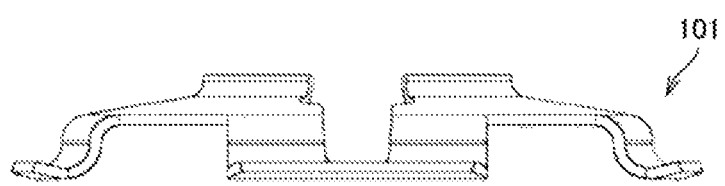
Figure 7:
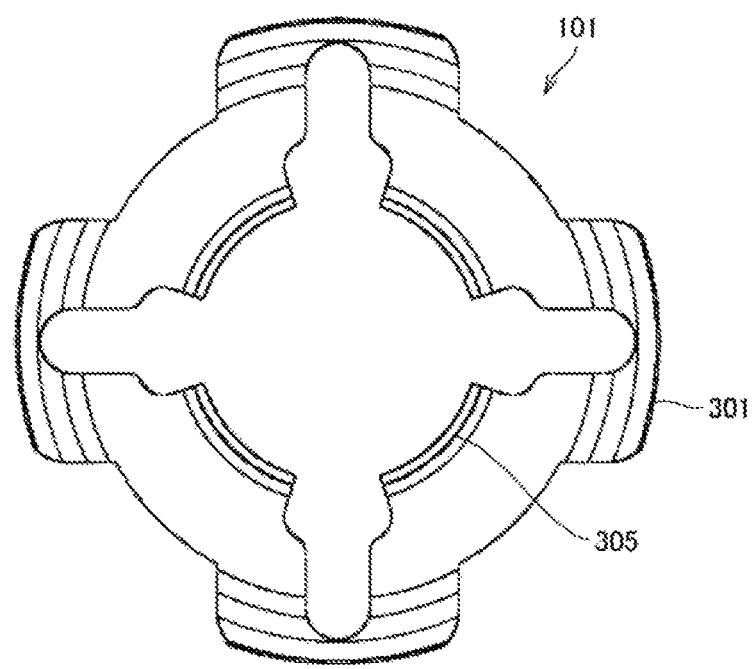
FIG. 7 is a plan view of the mirror fixing spring 101 of the polygon mirror scanner motor in FIG. 1.

FIGS. 6A and 6B are diagrams of the mirror fixing spring 101 of the polygon mirror scanner motor in FIG. 1 when viewed from an oblique side and from a lateral side. FIG. 6A is a diagram viewed from an oblique side. FIG. 6B is a diagram when viewed from a lateral side. FIG. 7 is a plan view of the mirror fixing spring 101 of the polygon mirror scanner motor in FIG. 1.

As illustrated in FIG. 7, the mirror fixing spring 101 has a shape having pressurizing sections 301 protruding, in a cross form (in four directions including the up, down, left, and right directions in FIG. 7), from an annular outer diameter section of the mirror fixing spring 101 in a plan view. Accordingly, the mirror fixing spring 101 can press the polygon mirror P at four points. As one example, it is shown that the pressing positions are arranged on lines intersected by respective perpendicular lines of a plurality of (four in the present embodiment) reflection surfaces of the polygon mirror P and by the rotary axial center, as shown in FIG. 1. However, the pressing positions are not limited to these positions.

In four directions including the upper right, lower right, upper left, and lower left directions in FIG. 7, engagement sections 305 are provided to the inner diameter section of the annular part of the mirror fixing spring 101. The engagement sections 305 are sections for fixing the mirror fixing spring 101 to the sleeve 105 by engaging with the spring fixing groove 121 of the sleeve 105. Sections with no engagement section 305 in the inner diameter section of the annular part (sections in four directions including the up, down, left, and right directions in FIG. 7) provided are cutout sections extending in the four directions including the up, down, left, and right directions in FIG. 7. The cutout sections extend to the vicinities of the pressurizing sections 301. By this shape, the mirror fixing spring 101 functions as a spring for pressing the polygon mirror P.

As illustrated in FIGS. 6A and 6B, end sections of the mirror fixing spring 101 are upwardly bent in the vicinities of the pressurizing sections 301. Thus, the pressurizing sections 301 are formed of curved surfaces. The polygon mirror P is pressed by the curved surface sections. Since the polygon mirror P is not pressed by straight shape sections, the mirror fixing spring 101 is prevented from biting into the polygon mirror P. The mirror fixing spring 101 is made flat in portions closer to end sides (the outer sides) than the curved surfaces.

In the assembly of the polygon mirror scanner motor, the inner diameter section of the polygon mirror P is fitted onto the cylindrical section 127 of the sleeve 105 from the above such that the lower surface of the polygon mirror P comes into contact with the annular seat surface 123. Thereafter, the mirror fixing spring 101 is fitted onto the sleeve 105 while the inner diameter section of the mirror fixing spring 101 slides on the outer diameter section of the sleeve 105, and the mirror fixing spring 101 is moved downward until the ends of the engagement sections 305 are fitted in the spring fixing groove 121 of the sleeve 105. When the ends of the engagement sections 305 are fitted in the spring fixing groove 121 of the sleeve 105, the pressurizing sections 301 press the polygon mirror P against the seat surface 123 by an appropriate spring force.

Herein, a surface of the polygon mirror P on a side to come into contact with the seat surface 123 (the lower surface in FIG. 8) is referred to as a first surface, and a surface of the polygon mirror P on a side to be pressed by the mirror fixing spring 101 (the upper surface in FIG. 8) is referred to as a second surface.

Figure 8:
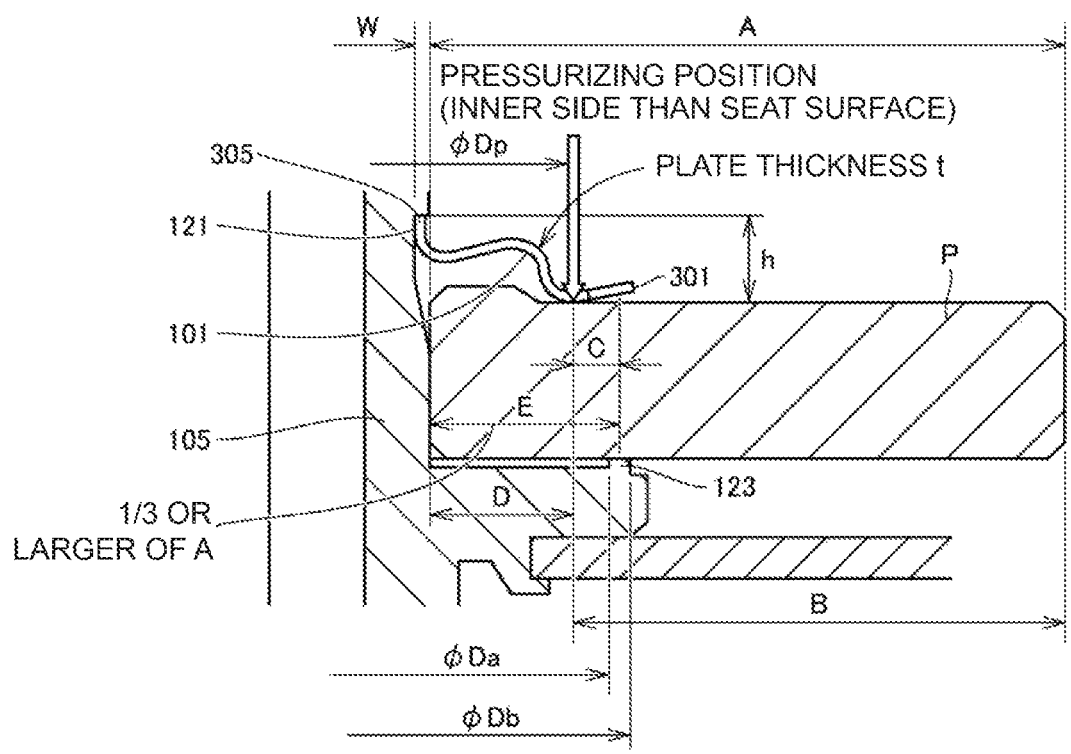
FIG. 8 is a partial cross-sectional view for explanation of a fixed state of a polygon mirror P in the polygon mirror scanner motor in FIG. 1.

FIG. 8 is a partial cross-sectional view for explanation of a fixed state of the polygon mirror P in the polygon mirror scanner motor in FIG. 1.

FIG. 8 shows a part of a cross section that includes a motor rotary shaft of the polygon mirror scanner motor and is orthogonal to a reflection surface of the polygon mirror P (the central cross section of the polygon mirror scanner motor). FIG. 8 shows the cross section when viewed from a direction orthogonal to the motor rotary shaft and shows a right part with respect to the motor rotary shaft.

In FIG. 8, the inner diameter section of the polygon mirror P is fitted to the outer diameter section of the sleeve 105, and the lower surface (the first surface) of the polygon mirror P is in contact with the upper portion of the seat surface 123. The engagement section 305 of the mirror fixing spring 101 is engaged with the spring fixing groove 121 of the sleeve 105. The pressurizing section 301 of the mirror fixing spring 101 downwardly presses (pressurizes) a flat surface section (a section including no protrusion, etc.) of the upper surface (the second surface) of the polygon mirror P.

In FIG. 8, the diameter of a circle which is centered on the motor rotary shaft and which passes through a plurality (four in the present embodiment) of pressurizing positions of the polygon mirror P by the mirror fixing spring 101 is denoted by ΦDp. The diameter of a circle which is centered on the motor rotary shaft and which passes through an inner diameter side end of the seat surface 123 is denoted by ΦDa. The diameter of a circle which is centered on the motor rotary shaft and which passes through an outer diameter side end of the seat surface 123 is denoted by ΦDb.

Here, the polygon mirror scanner motor is designed such that the relationships of $$\Phi Dp < \Phi Da < \Phi Db, \text{ and}$$

$$\Phi Db - \Phi Da > 0.1 \text{ mm}$$

are established.

That is, the distance between the motor rotary shaft and the pressurizing position of the polygon mirror P by the mirror fixing spring 101 is shorter than the distance between the motor rotary shaft and a position at which the polygon mirror P comes into contact with the seat surface 123. Further, the length, in a direction orthogonal to the motor rotary shaft, of the seat surface 123 is longer than 0.1 mm.

Also, in FIG. 8, the difference between the outer radius and the inner radius of the polygon mirror P is denoted by A. The outer radius herein refers to the distance from the rotary axis of the polygon mirror P to an outer periphery (a reflection surface) of the polygon mirror P. The inner radius refers to the distance from the rotary axis of the polygon mirror P to the outer circumference of a hole section formed at the center portion of the polygon mirror P so as to extend through the sleeve 105.

A horizontal distance (a distance in a direction orthogonal to the rotary axis) between the pressurizing position of the polygon mirror P by the mirror fixing spring 101 and the outer diameter position of the polygon mirror P is denoted by B. The outer diameter position of the polygon mirror P herein refers to the position of an outer periphery (a reflection surface) of the polygon mirror P closest to the rotary axis of the polygon mirror P.

The difference between the distance from the motor rotary shaft to the center position between the inner diameter and the outer diameter of the seat surface 123 (the distance between the motor rotary shaft and a position at which the polygon mirror P comes into contact with the seat surface 123), and the distance between the motor rotary shaft and the pressurizing position of the polygon mirror P by the mirror fixing spring 101 is denoted by C.

A horizontal distance (a distance in the direction orthogonal to the rotary axis) between the pressurizing positions of the polygon mirror P by the mirror fixing spring 101 and the inner diameter section of the polygon mirror P (a contact section between the inner diameter section of the polygon mirror P and the sleeve 105) is denoted by D.

A horizontal distance (a distance in the direction orthogonal to the rotary axis) between the center position between the inner diameter and the outer diameter of the seat surface 123 and the inner diameter section of the polygon mirror P (the contact section between the inner diameter section of the polygon mirror P and the sleeve 105) is denoted by E.

A height position of the highest portion (the end of the engagement section 305) of the spring fixing groove 121 when the upper surface of the polygon mirror P is regarded as a reference surface, is denoted by h.

The depth, in the direction orthogonal to the motor rotary shaft, of the spring fixing groove 121 is denoted by W.

The plate thickness of the mirror fixing spring 101 is denoted by t.

The polygon mirror scanner motor of the present embodiment is designed such that the relationships of $0 < C \leq A/4,$ $A/3 \leq E \leq A/2,$ and $t < W$ are established.

Regarding the dimension of C, it is indicated that the pressurizing position, in a radius direction (an outward direction from the rotary axis) of the polygon mirror P, by the mirror fixing spring 101 is positioned at a more radially inner side than the position of the seat surface 123 in the radius direction.

Regarding the dimension of E, it is indicated that the position of the seat surface 123 is at a distance of one third or larger of A, which is the difference between the outer radius and the inner radius of the polygon mirror P, in a direction from the inner diameter section of the polygon mirror P to the reflection surface side (outward from the rotary axis) of the polygon mirror P. When the position of the seat surface 123 becomes closer to a reflection surface of the polygon mirror P, deformation becomes greater. Therefore, the upper limit of the value of E is set to half of A.

Regarding the dimension of t, the depth W of the spring fixing groove 121 is set to be equal to or larger than the spring thickness t, in order to prevent the mirror fixing spring 101 from coming off having entered the spring fixing groove 121. In addition, in order to set the pressurizing position by the mirror fixing spring 101 to an inner side and to adjust the pressing load, the plate thickness t is made small.

When A is 5 (mm), $0 < C \leq 1.25,$ and $1.67 \leq E \leq 2.5.$

When A is 5.07 (mm), $0 < C \leq 1.27,$ and $1.69 \leq E \leq 2.535.$

Figure 9:
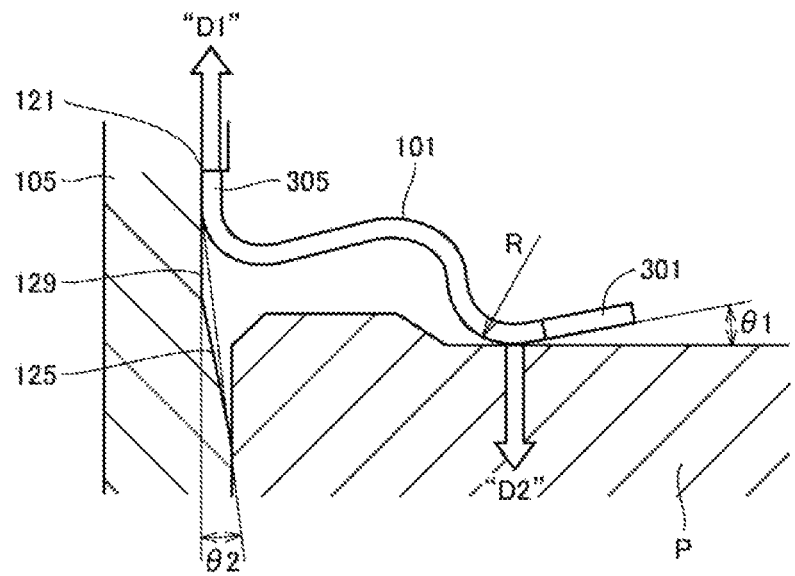
FIG. 9 is a partial cross-sectional view for explanation of an action exerted by the mirror fixing spring 101 in the polygon mirror scanner motor in FIG. 1.

FIG. 9 is a partial cross-sectional view for explanation of an action exerted by the mirror fixing spring 101 in the polygon mirror scanner motor in FIG. 1.

An end, in an outer diameter direction, of the mirror fixing spring 101 is the pressurizing section 301. The pressurizing section 301 includes a curved surface section. The mirror fixing spring 101 pressurizes the flat surface section of the polygon mirror P via the curved surface section. The curvature radius of the curved surface section is denoted by R. Here, the polygon mirror scanner motor is designed such that the relationship of $R > 0.2$ mm is established. A horizontal surface of the mirror is pressurized by the curved surface section of the mirror fixing spring 101 having R.

Further, a flat surface section is provided on a side that is further out than the curved surface section of the pressurizing section 301 of the mirror fixing spring 101. The angle between the flat surface section provided to the mirror fixing spring 101 and the flat surface section of the polygon mirror P is denoted by θ1.

Moreover, an angle between a plane of the inner end section of the mirror fixing spring 101 and a plane parallel to the rotary shaft (the outer circumferential surface of the cylindrical section 129) is denoted by θ2. Here, the polygon mirror scanner motor is designed such that the relationships of $\theta 1 > 2°,$ and $\theta 2 < 45°$ are established.

The design is made such that, by adjustment of θ2 and adjustment of the inner diameter of the mirror fixing spring 101 and the outer diameter of the spring fixing groove 121, bracing forces in substantially upward and downward directions act on the sleeve 105 and the polygon mirror P, as indicated by arrows "D1", "D2" in FIG. 9.

Figure 10:
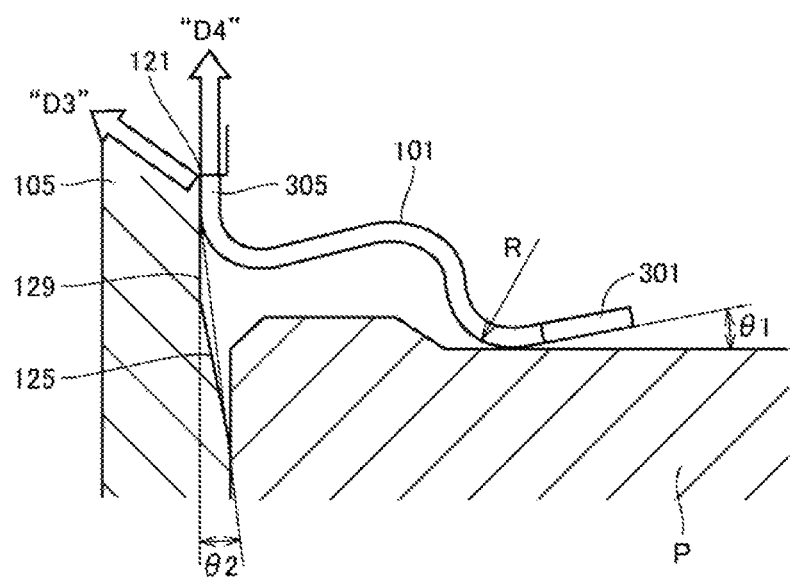
FIG. 10 is a partial cross-sectional view for explanation of an action exerted by the mirror fixing spring 101 in the polygon mirror scanner motor in FIG. 1.

FIG. 10 is a partial cross-sectional view for explanation of an action exerted by the mirror fixing spring 101 in the polygon mirror scanner motor in FIG. 1.

By establishment of θ2<45°, deformation of the mirror fixing spring 101 in the sleeve 105 inner diameter direction can be suppressed at the time the mirror fixing spring 101 is attached. By adjustment of θ2 to an angle smaller than 45°, the mirror fixing spring 101 braces against the spring fixing groove 121 upon fixation of the polygon mirror P with the mirror fixing spring 101 while the mirror fixing spring 101 is deformed in the sleeve 105 inner diameter direction, so that a large force is added in the arrow "D4" direction in FIG. 10. If θ2 is equal to or larger than 45°, a force is likely to be added in the arrow "D3" direction in FIG. 10. Accordingly, it is preferable that θ2<45° is established.

Figure 11:
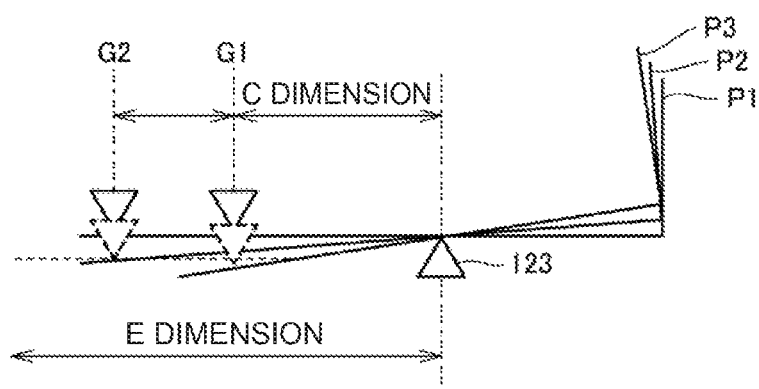
FIG. 11 is a diagram for explanation of the dimension of C in FIG. 8.

FIG. 11 is a diagram for explanation of the dimension of C in FIG. 8.

In FIG. 11, the relationship between the position of the seat surface 123 and pressurizing positions G1, G2 of the polygon mirror P by the mirror fixing spring 101 is shown. The inclination of a reflection surface of the polygon mirror P is denoted by P1 to P3. The inclination of the reflection surface of the polygon mirror P relative to the rotary shaft of the motor becomes larger from P1 to P3.

When it is assumed that the polygon mirror P is pressed by the same load and the same amount of deflection occurs, the effect of the larger dimension of C on the reflection surface of the polygon mirror P is more pronounced. Therefore, the polygon mirror scanner motor is designed such that the relationship of $0<C\leq A/4$ is established.

Figure 12:
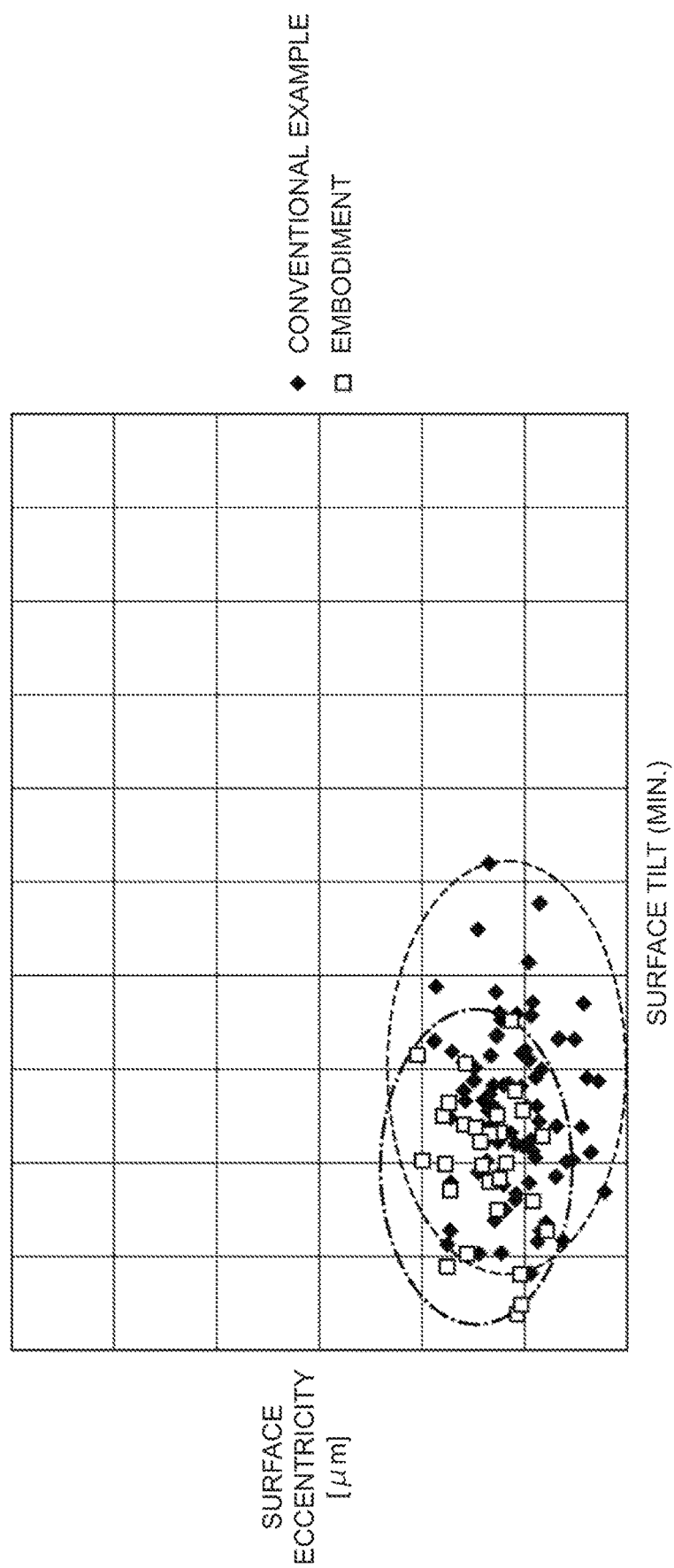
FIG. 12 is a diagram for explanation of an effect of the embodiment of the present disclosure.
Figure 13:
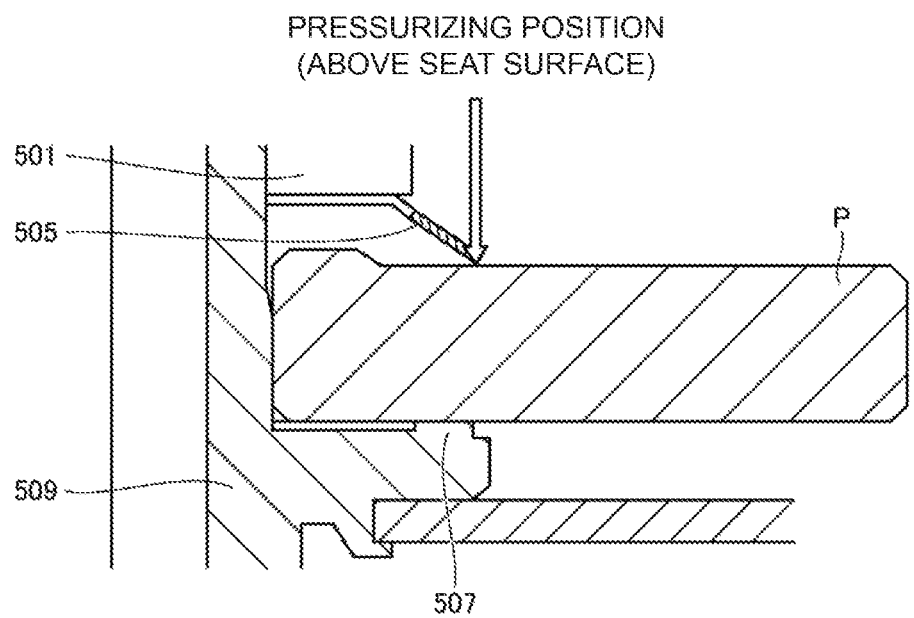
FIG. 13 is a partially enlarged view for explanation of a configuration for holding a polygon mirror P in a first example of the conventional technique.
Figure 14:
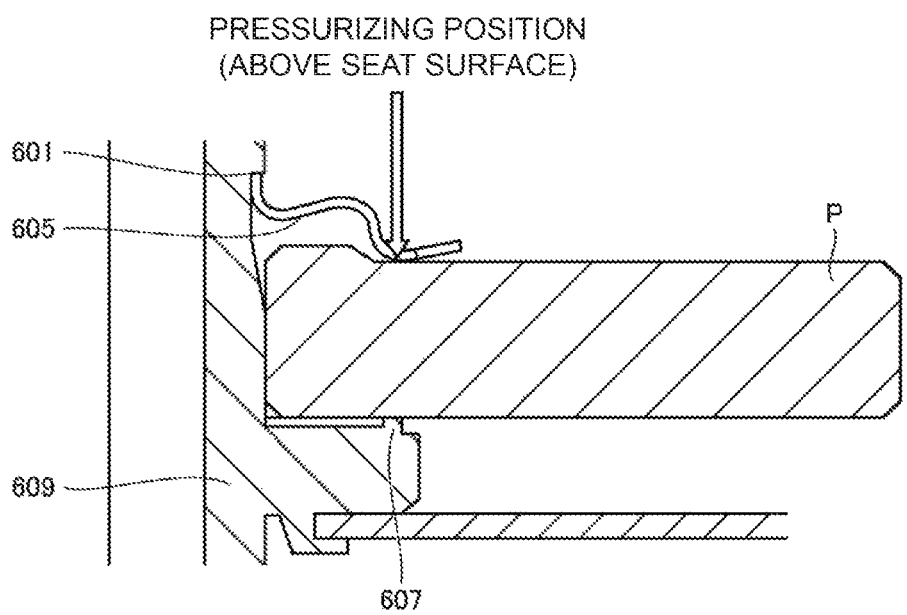
FIG. 14 is a partially enlarged view for explanation of a configuration for holding a polygon mirror P in a second example of the conventional technique.

FIG. 12 is a diagram for explanation of an effect of the embodiment of the present disclosure.

In FIG. 12, the relationship between a surface tilt and a surface eccentricity in a polygon mirror in a polygon mirror scanner motor before application (the conventional example) and after application (the embodiment) of the present disclosure, is shown.

It is shown that, as a result of carrying out the present disclosure, the pressing positions of the polygon mirror by the mirror fixing spring are set to sides further in than the seat surface, whereby deformation of the polygon mirror is reduced and a surface tilt is reduced.

As described above, the present inventor has found the positional relationship in which, when the relationship, in the radius direction of a polygon mirror, between pressurizing positions and a seat surface position is changed, deformation of the polygon mirror is likely to be reduced so that a surface tilt in the polygon mirror is reduced.

Furthermore, in order to suppress deformation of the mirror fixing spring in the sleeve inner diameter direction at the time of fixation of the mirror fixing spring, the angle θ2 is restricted. Moreover, in order to prevent the mirror fixing spring from applying an unnecessarily excessive load to the polygon mirror at a time of insertion of the mirror fixing spring, the dimensions R, θ1 are restricted.

In the polygon mirror scanner motor described in the above embodiment, reduction in the number of components can be achieved. In addition, deformation of the polygon mirror is reduced and a surface tilt is reduced (improvement of a surface tilt ability can be achieved so that the polygon mirror can be attached with excellent precision).

It should be considered that the aforementioned embodiment is exemplary in terms of all the points and is not restrictive. The scope of the present disclosure is defined by not the aforementioned description but by the claims, and is intended to encompass meanings equivalent to the claims and any modification within the scope of the claims.

What is claimed is:

1. A polygon mirror scanner motor comprising:
a sleeve to which a polygon mirror is attached and which is rotatable about a rotary shaft;
a seat surface rotatable, together with the sleeve, about the rotary shaft; and
a mirror fixing spring configured to fix the polygon mirror, wherein
the polygon mirror includes a first surface and a second surface,
the first surface of the polygon mirror comes into contact with the seat surface,
the mirror fixing spring includes a curved surface section,
a flat surface section of the second surface of the polygon mirror is pressurized by the curved surface section of the mirror fixing spring,
a distance between the rotary shaft and the pressurizing position of the polygon mirror by the mirror fixing spring is shorter than a distance between the rotary shaft and an inner diameter side end of the seat surface,
when a difference between an outer radius and an inner radius of the polygon mirror is defined as A, and
a difference between the distance between the rotary shaft and the pressurizing position of the polygon mirror by the mirror fixing spring and the distance from the rotary shaft to a center position between the inner diameter side end and an outer diameter side end of the seat surface is defined as C, the relationship of $$0<C\leq A/4$$

is established,
an inner diameter side of the polygon mirror comes into contact with the sleeve, and
when a distance, in a direction orthogonal to the rotary shaft, between a position at which the inner diameter side of the polygon mirror comes into contact with the sleeve and the position of the seat surface is defined as E, the relationship of $$A/3\leq E\leq A/2$$

is established.

2. The polygon mirror scanner motor according to claim 1, wherein
the mirror fixing spring pressurizes a flat surface section of the polygon mirror.

3. The polygon mirror scanner motor according to claim 1, wherein
a length, in the direction orthogonal to the rotary shaft, of the seat surface is longer than 0.1 mm.

4. The polygon mirror scanner motor according to claim 1, wherein
a spring fixing groove is formed in the sleeve,
the mirror fixing spring engages with the spring fixing groove, and
when
a plate thickness of the mirror fixing spring is defined as t, and
a depth, in the direction orthogonal to the rotary shaft, of the spring fixing groove is defined as W, the relationship of $$t<W$$

is established.

5. The polygon mirror scanner motor according to claim 1, wherein
a curvature radius R of the curved surface section is larger than 0.2 mm.

6. The polygon mirror scanner motor according to claim 1, wherein
the mirror fixing spring includes a curved surface section,
the mirror fixing spring pressurizes the flat surface section of the polygon mirror via the curved surface section,
a flat surface section is provided on a side that is further out than the curved surface section of the mirror fixing spring, and
an angle θ1 between the flat surface section provided to the mirror fixing spring and the flat surface section of the polygon mirror is larger than 2°.

7. The polygon mirror scanner motor according to claim 1, wherein
a spring fixing groove is formed in the sleeve,
the mirror fixing spring engages with the spring fixing groove through a flat surface of an inner end section of the mirror fixing spring, and an angle θ2 between the flat surface of the inner end section of the mirror fixing spring and a plane parallel to the rotary shaft is smaller than 45°.

8. A polygon mirror scanner motor comprising:
a sleeve to which a polygon mirror is attached and which is rotatable about a rotary shaft;
a seat surface rotatable, together with the sleeve, about the rotary shaft; and
a mirror fixing spring configured to fix the polygon mirror, wherein
the polygon mirror includes a first surface and a second surface,
the first surface of the polygon mirror comes into contact with the seat surface,
the second surface of the polygon mirror is pressurized by the mirror fixing spring,
a distance between the rotary shaft and a pressurizing position of the polygon mirror by the mirror fixing spring is shorter than a distance between the rotary shaft and an inner diameter side end of the seat surface, the mirror fixing spring pressurizes a flat surface section of the polygon mirror, and
when a difference between an outer radius and an inner radius of the polygon mirror is defined as A, and
a difference between the distance between the rotary shaft and the pressurizing position of the polygon mirror by the mirror fixing spring and the distance between from the rotary shaft to a center position between the inner diameter side end and an outer diameter side end of the seat surface is defined as C, the relationship of $$0 < C \le A/4$$

is established.

9. The polygon mirror scanner motor according to claim 8, wherein
the mirror fixing spring includes a curved surface section, and
the mirror fixing spring pressurizes the flat surface section of the polygon mirror via the curved surface section.

* * * * *